United States Patent [19]

Yen

[11] Patent Number: 4,867,885

[45] Date of Patent: Sep. 19, 1989

[54] VACUUM SUCTION TYPE ANTI-CLOGGING AND DIALYSIS DEVICE FOR FILTRATION SYSTEMS

[76] Inventor: Richard C. K. Yen, 4261 Chase Ave., Los Angeles, Calif. 90066

[21] Appl. No.: 311,345

[22] Filed: Feb. 16, 1989

[51] Int. Cl.[4] ............................................. B01D 13/00
[52] U.S. Cl. ............................ 210/636; 210/321.69; 210/406; 210/407
[58] Field of Search .................. 210/636, 321.69, 406, 210/407

[56] References Cited

U.S. PATENT DOCUMENTS 3,501,012 3/1970 Ryan ..................................... 210/406
4,749,476 6/1988 Storkebaum et al. ............ 210/406 X Primary Examiner—Frank Spear
Attorney, Agent, or Firm—Thomas I. Rozsa

[57] ABSTRACT

A method and apparatus wherein a conventional vacuum operated filter unit which generates a positive pressure on the particulates in a suspension against a filter membrane is converted into an anti-clogging filter unit through addition of a supplemental device which generates a counteracting negative pressure on the suspension as it is being filtered, thereby pulling the particulates in the suspension away from the filter membrane. A conventional vacuum-operated filter unit which causes the suspension to be pulled toward the filter membrane by a vacuum source and thereby creates clogging of the filter membrane with particulates from the suspension is converted into an anti-clogging filter unit by the addition of a supplemental device placed into the top chamber of the filter unit wherein the supplemental device generates a negative pressure on the filter membrane through a second vacuum source acting on the supplemental device which causes the particulates to be pulled away from the filter membrane as the suspension is filtered and permits the retentate to rest within the top chamber of filter unit while the filtrate rests within the bottom chamber of the conventional vacuum-operated filter unit.

15 Claims, 2 Drawing Sheets

VACUUM SUCTION TYPE ANTI-CLOGGING AND DIALYSIS DEVICE FOR FILTRATION SYSTEMS

BACKGROUND OF THE INVENTION

1. Field of the Invention

The present invention relates to filtration systems. Filtration systems have conventionally been used for either (1) removal of particulate matters from fluid suspensions to result in clear, non-turbid fluids or, (2) removal and discarding of part of the soluble and fluid fraction for the purpose of concentrating the desirable particulate matters. To achieve the first purpose, the filter in the system is used to trap the particulate matters by virtue of the effective pore sizes being smaller than the particulate matters, while allowing the soluble fraction to go through the filter pores and collected for subsequent use. To achieve the second purpose, the ideal filter will allow the soluble fraction to go through the filter pores with only minimal entrapment of the particulate matters which are then returned to collection containers as the "retentate" fraction for subsequent use. In both procedures, clogging of the filter remains a major problem.

2. Description of the Prior Art

The clogging of filter pores is a major problem with prior art filtration and dialysis devices. Clogging of the filter pores quickly reduces the efficiency of the filtration system. As the number of unclogged pores diminishes, filtration rate decreases. Since flow rate is equal to pressure gradient divided by resistance, as more and more filter pores are clogged (increasing resistance), a progressively larger pressure gradient is needed to maintain adequate flow rates. Even then, when enough of the filter pores become clogged, flow rate will become for all practical purposes, zero. At that point, particulate matters can no longer be removed from fluid suspensions. In addition, if the purpose is to concentrate suspended particulate matters, clogging of filters will decrease the final yield of the particulate matters and may in fact decrease the concentration of such matters in the retentate.

To minimize the problem of clogging, various approaches have been designed, as reflected in different filtration systems on the market. One approach incorporates designs for vigorous stirring of the suspension physically above, or prior to interaction of the suspension with the filter surface. Examples include the Stirred Cells Series of Amicon Division, W. R. Grace & Co. However, such systems are ineffective because the distance between the stirring mechanism and the filter membrane (typically in millimeters) are several orders of magnitude larger than the diameter of the particles (typically in microns). Once the particulate matters are trapped within the filter pores, with constant positive filtration pressure pressing them against the filter membrane, agitation at a far distance (relative to the size of the particulate matters) will not effectively dislodge them. Moreover, high shearing forces generated by vigorous stirring may cause foaming and denaturation of the particulate matters.

Another approach involves the concept of tangential flow as exemplified by Millipore's Minitan system. Instead of applying pressure perpendicular to the surface of the filter, the suspension is pushed forward by positive pressure from a pump system so that it travels in a direction tangential to the filter surface. In theory, this design allows the particulate matters to travel in a direction tangential to the filter surface while the soluble phase goes through the filter pores in a direction perpendicular to the filter surface. In practice, substantial clogging still occurs. The reason is that the particulate matters are carried by the soluble phase of the suspension and will travel in the direction of the immediate fluid surrounding a given particle. Any time a fraction of the soluble phase goes through the filter pores (in a direction perpendicular to the filter surface), a proportional amount of particulate matters will travel with it in the same direction. Regardless of the direction of flow of the rest of the suspension bulk (which may travel in a direction tangential to the filter surface), the fraction that goes through the pores will clog up the pores. With this understanding, it becomes clear that tangential flow filter systems are only different ways of recirculating the bulk of the suspension before its interaction with the filter pores. This design does not substantially alter the clogging potentials of particulate matters at the level of the filter pores because the particulate matters are again pressed onto the pores by the positive pressure used to circulate the bulk of the suspension.

Since both the stirred cell design and the tangential flow systems use positive pressure to circulate the suspension, they both result in trapping of particulate matters within the matrix of the filter membrane. For this reason, these systems are not suitable for the purpose of concentrating particular matters. There exists a need for a novel design where: (1) the filter membrane will not be clogged, and (2) should unexpected change in the filtration condition lead to some clogging, the obstructed pores will become unclogged again. Such a device will allow efficient concentration of valuable particulate matters. In addition, because of the increased life span of the filter membrane, it also allows cost-efficient collection of the soluble phase of the suspension, if the soluble phase is the desirable fraction from the suspension.

SUMMARY OF THE PRESENT INVENTION

To minimize the problem of clogging and to achieve undiminishing filtration rates and to concentrate the desirable retainable material, the present invention anti-clogging device has the following essential features:

1. Instead of using positive pressure to push the suspension onto the surface of the filter (whether the bulk of suspension travels in a direction perpendicular to or tangential to the surface of the filter), this device employs a negative pressure to pull the suspension away from the surface of the filter membrane. The definition of positive pressure is hereby defined as pressure forcing the suspension toward the retention surface of the filter for the particulate matters. The retention surface is that surface of the filter which faces the suspension and retentate, and which faces away from the filtrate. By this definition, conventional filtration systems using a negative suction from a vacuum source downstream from the filter unit in fact also applies a positive pressure on the particulate matters onto the filter retention surface. The present invention, by contrast, is truly anti-clogging and is novel because it is designed to actually pull particulate matters away from the retention surface of the filters.

2. The forces of negative pressure applied on the particulate matters pulling them away from the surface of the filter will be the greatest in locations within the filtration system where such particulate matters are most likely to clog the filter.

3. While most of the filtration units on the market depend on positive pressure generated by pump systems to deliver the suspensions to the filter unit, some smaller filter units use a vacuum source to pull the suspension onto the retention surface which is still a positive pressure onto the filter membrane to thereby cause clogging. One example of such a vacuum—operated filter unit is the Sterifil-D Filter Units (Millipore) comprising a two-compartment structure, with the top compartment serving as a holding reservoir, separated by a filter membrane from the bottom (filtrate-collection) compartment. The vacuum initially generated by the vacuum source via an outlet on the bottom compartment creates a positive pressure on the retention surface of the filter membrane through which the filtrate is drawn from the suspension in the top compartment.

In contrast, the present invention incorporates a novel design to be used in conjunction with a vacuum source to thereby create a source of negative pressure on the retention surface of the filter membrane, which will pull the particulate matter away from the filter surface. We define here as particulate matter any particles that are too large to pass through the filter pores and have the potential of clogging the filter membrane. Therefore, by this definition, particles can be macroscopically visible solids, or microscopically invisible dissolved molecules (e.g. protein macro molecules) which can clog up specially designed molecular-sieving filter membranes.

It has been discovered, according to the present invention, that the creation of a source of negative pressure in a direction opposite to the direction of flow of the filtrate creates a force to pull particulate matter away from the filter membrane rather than push it into the filter membrane, thereby providing an anti-clogging device which assures that the filter will have a long and useful life.

It has additionally been discovered, according to the present invention, that a conventional vacuum type filter unit which causes the suspension to be pulled toward the filter membrane by a vacuum source (and thereby creates clogging of the filter membrane with particulates from the suspension) can be converted into an anti-clogging filter by the use of a supplemental device attached to the conventional vacuum filter unit wherein the supplemental device generates a negative pressure on the filter membrane through a second vacuum source acting on the supplemental device which causes the particulates to be pulled away from the filter membrane as the suspension is filtered and permits the retentate to rest within the top reservoir compartment while the filtrate rests within the bottom collection compartment of the conventional vacuum filter unit.

It is therefore an object of the present invention to provide an apparatus and method whereby a suspension comprising particulate matter can be filtered to either remove the particulate or to remove filtrate and increase the concentration of particulate matter in the remaining retentate in a manner in which the filter will not become clogged with particulate matter.

It is another object of the present invention to provide a method and apparatus wherein a conventional vacuum filter which generates a positive pressure on particulates from a suspension against a filter membrane can be converted into an anti-clogging filter through addition of a supplemental device which generates a counteracting negative pressure on the suspension as it is being filtered, thereby pulling the particulates in the suspension away from the filter membrane.

It is a further object of the present invention to provide a negative pressure filtration device to be used in conjunction with a vacuum source rather than a pump source to generate the force by which suspension is caused to be filtered.

Further novel features and other objects of the present invention will become apparent from the following detailed description, discussion and the appended claims, taken in conjunction with the drawings.

DRAWING SUMMARY

Referring to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
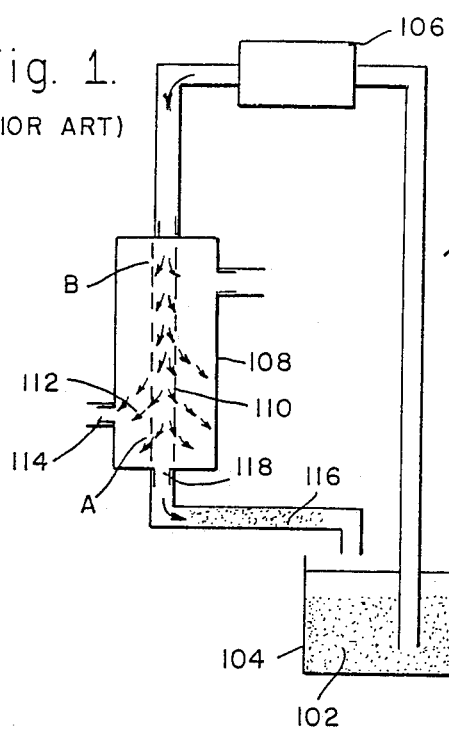
FIG. 1 is a schematic flow diagram of prior art filtration systems in a vertical orientation, illustrating the direction of flow of both the suspension and the filtrate.
Figure 2:
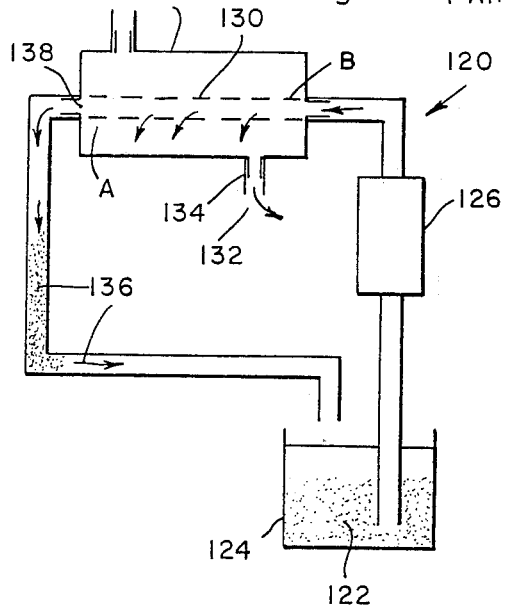
FIG. 2 is a schematic flow diagram of prior art filtration systems in a horizontal orientation, illustrating the direction of flow of both the suspension and the filtrate.

Referring to FIGS. 1 and 2, there is illustrated the direction of flow of both the suspension and the filtrate in conventional arrangements of filter units, in a vertical position, and in a horizontal position, respectively. In FIG. 1, the vertical flow filter arrangement 100 illustrates the suspension 102 located in suspension holding tank 104. The pump 106 is located upstream of filter unit 108 and its filter membrane 110. The pump 106 sucks suspension 102 out of suspension holding tank 104 and pushes it with positive pressure toward filter unit 108 and onto filter membrane 110. The filtrate 12 exits opening 114 of filter unit 108 while the retentate 116 exits the filter unit at its bottom outlet opening 118 and flows back into the suspension holding tank 104. In FIG. 2, the horizontal flow filter arrangement 120 illustrates the suspension 122 located in suspension holding tank 124.

The pump 126 is located upstream of filter unit 128 and its filtration membrane 130. The pump 126 sucks suspension 122 out of suspension holding tank 124 and pushes it with positive pressure forward filter unit 128 and onto filtration membrane 130. The filtrate 132 exits opening 134 of filter 128 while the retentate 136 exits the filter unit at its remote exit opening 138 and flows back into the suspension holding tank 124. Examination of each of the filter units after filtration of a suspension will show that most clogging occurs at location A which is near the outlet of the filter unit, and much less at location B which is near the inlet of the filter unit. This is because there is a pressure gradient from the inlet of the filter unit to the outlet of the same unit. Therefore, the amount of clogging is not uniform within the filter unit. What is common to both units is the fact that the filter membranes (110 and 130) become clogged with the particulate matter because the suspension is pushed with positive pressure onto the filter membrane (110 and 130 respectively) by the pump which is located upstream of the filter.

Figure 3:
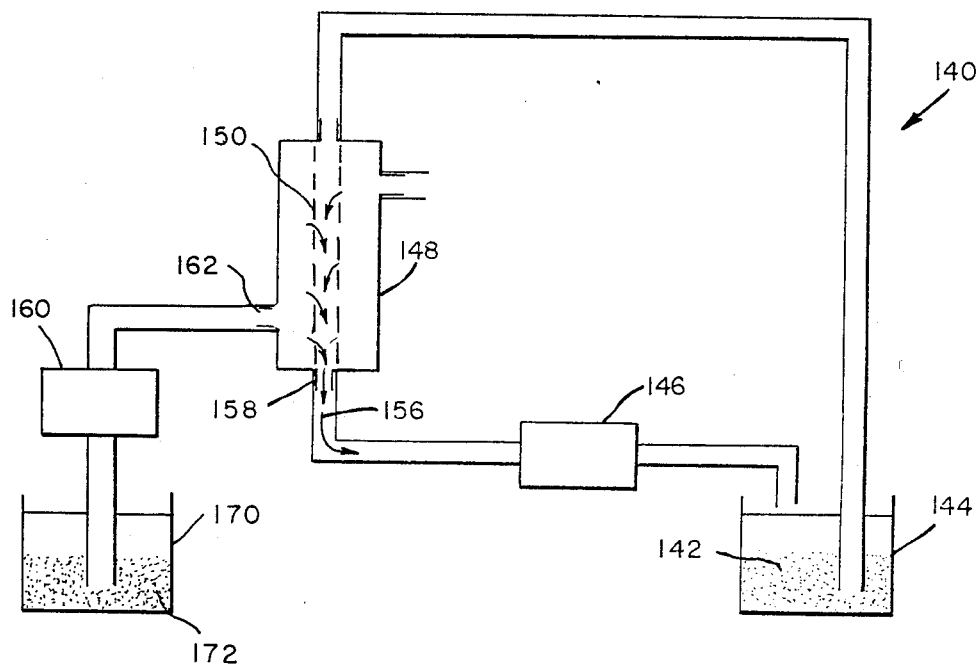
FIG. 3 is a schematic flow diagram illustrating a key principle of the present invention, namely having the pump downstream from the filter unit, drawing the suspension through the filter unit with a negative pressure with respect to the retention surface of the filter membrane.

A key principle of the present invention is illustrated in the schematic flow diagram of FIG. 3. The flow filter arrangement 140 illustrates the suspension 142 located in suspension holding tank 144. The pump 146 is located downstream of filter 148 and its filter membrane 150. The pump 146 sucks suspension 142 out of suspension holding tank 144 and causes it to flow through filter unit 148 but pulling the retentate 156 away from the filter membrane 150. The retentate 156 exits the filter unit at its remote opening 158 and is pulled away from the filter unit 148 by the pump 146 which then causes the retentate to flow back into tank 144. FIG. 3 illustrates the importance of having the pump downstream from the filter unit. With the jacket filled with suspensions of a different color, it can be easily demonstrated that the flow of fluid from the jacket into the center of the hollow filter fibers is such that particulate matters from the suspension will be swept away from the retention surface 150 of the filter 148.

Referring further to FIG. 3, a second pump 160 extracts filtrate 172 through a side opening 162 in the filter unit wall. The filtrate 172 is collected in filtrate tank 170. The extraction of filtrate 172 creates a positive pressure on the filter membrane 150 which would tend to clog it. However, a key principal of the present invention is that the flow rate of pump 146 is much greater than the flow rate of pump 160 and therefore the negative pressure on the filter membrane 150 created by pump 146 overcomes the positive pressure on the filter membrane created by pump 160, thereby removing clogs.

Figure 4:
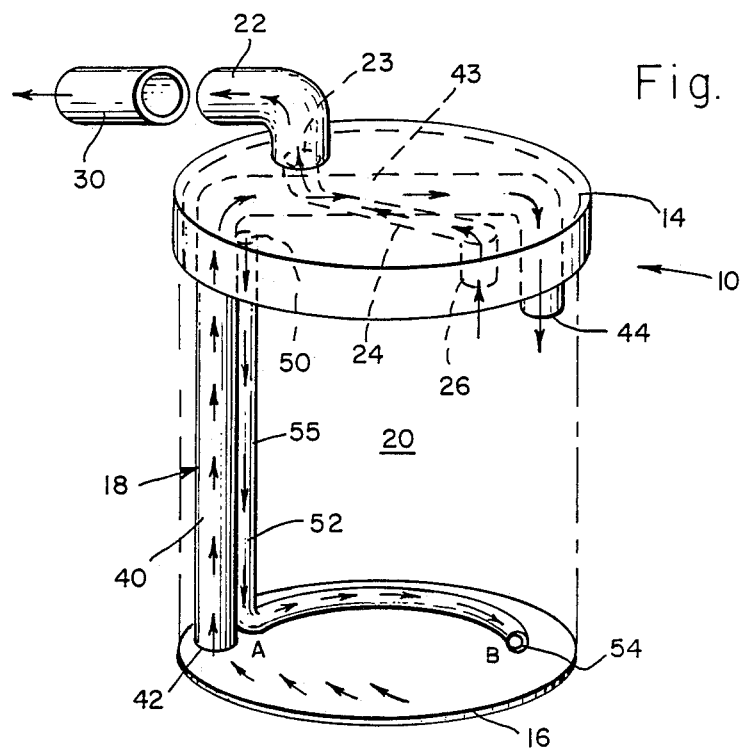
FIG. 4 is a perspective view in partial cross-section of the present invention anti-clogging and dialysis device for filtration systems, shown placed inside the top compartment of a conventional two-compartment vacuum-operated filter unit with only the top compartment shown and drawn in dashed lines.

FIG. 4 shows the present invention which embodies the negative pressure principal set forth above. While most of the filtration units on the market are dependent on positive pressure generated by pump systems to deliver the suspensions to the filter unit, some smaller filter units use a vacuum source to pull the suspensions onto the retention surface. The vacuum source, analogous to pump 160 of FIG. 3, creates a positive pressure on the retention surface of the filter membrane. The present invention is designed to be adapted to such vacuum source systems, but it provides the means to counteract the positive pressure generated by the vacuum source. A negative pressure is created in the upper chamber of the conventional two chamber vacuum-operated filter unit by the use of another vacuum source, analogous to the recirculating pump 146 of FIG. 3, which can overcome the above-mentioned positive pressure on the filter membrane.

The anti-clogging apparatus 10 comprises a top 14, a bottom section 16 and a connecting double-column 18. Referring to FIG. 4, the bottom and connecting column can be placed into the top compartment or chamber 20 of a conventional two-compartment vacuum-operated filter unit, while the top of this apparatus replaces the removable top that comes with a conventional vacuum-operated filter unit and forms an air tight seal with the rim of the upper compartment of the filter unit. Protruding from the top 14 is a suction port 22 which in turn is connected via opening 23 to a portion of tubing 24 which extends under top 14 interiorly within the upper chamber 20 of the filter unit and terminates in opening 26. The suction port 22 is attached to a source of vacuum 30 which generates a vacuum condition within the chamber 20. As air is initially sucked out of the chamber 20 through opening 26, a partial vacuum is created inside the otherwise airtight upper chamber 20 of the filter unit.

A main fluid tube 40 extends from an opening 42 in the bottom 16 upwardly along the connecting column 18 beneath the top 14 and terminates in an opening 44 which is adjacent opening 26 in suction tube 24. While the horizontal portion 43 of the fluid tube 40 is shown adjacent and above suction tube 24, it can also run inside the suction tube 24 and also parallel to tube 24, and then extend back into the upper compartment 20 so that in all arrangements opening 44 lies adjacent the opening 26. It is important that the openings be adjacent each other so that when the suction is on, the initial pulling force can overcome the inertia of the suspension and allow the suspension to flow upward inside the fluid tube 40 and start to recirculate.

As the vacuum continues to draw air out of the upper chamber of the filter unit, some air must be allowed into the system. Otherwise, there will be a net negative pressure (compared to atmospheric pressure) but no net movement of fluid. The anti-clogging device 10 further comprises an air inlet 50 which is an opening in the top 14 and which opens into an air inlet tube 52 that extends adjacent the fluid tube 40 and terminates in an opening 54 which opens into the chamber 20 at a location remote from openings 26 and 44. This air inlet will allow air to bubble through the opening 54 to increase agitation of the suspension.

To facilitate recirculation of the suspension, openings 44, 26 and 54 must have different resistance, e.g. the opening 44 must be larger than the opening 26, which in turn is larger than the opening 54. Ideally, the resistance of the tube 52 ending in opening 54 should be such that when the suction is turned on, the vacuum created in chamber 20 would preferentially suck the suspension up the entire column of the fluid tube 40, across the horizontal portion of tube 40 and out of opening 44 before air enters into the system via opening 54.

Once the recirculation is started, the negative pressure at A is equal to the column height of fluid tube 40 times the density of the suspension (same principle as a barometer).

Figure 5:
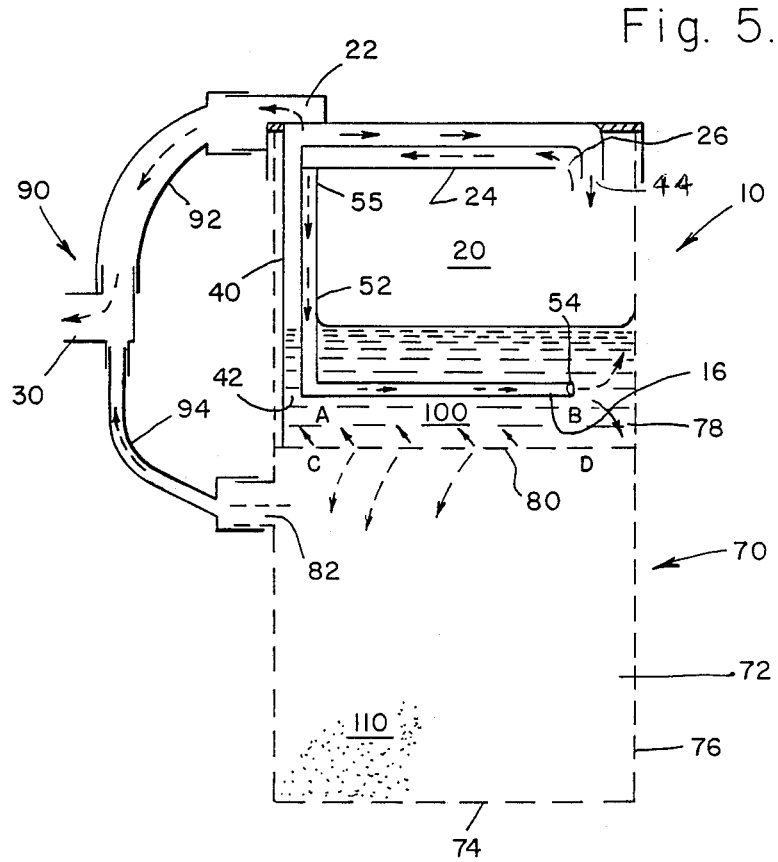
FIG. 5 is a cross-sectional view of the present invention anti-clogging device for filtration systems placed inside the top compartment of a conventional two-compartment vacuum-operated filter unit.

Referring to FIG. 5, the present invention anti-clogging apparatus 10 is placed inside the upper chamber of a conventional filter unit 70 which comprises a bottom collection chamber 72 bounded by the bottom 74 and sidewall 76 and an upper reservoir chamber 20. Conventional vacuum-operated filter unit 70 usually has a loose-fitting top merely to prevent contaminants from falling into upper reservoir chamber 20. For use in conjunction with the present invention, the conventional top is removed and the top 14 of the present invention is used to seal the rim of the upper chamber of the filter unit 70. The filter membrane 80 is located between the upper and bottom chambers. The direction of the solid arrows on the filter membrane 80 shows the method by which the suspension to be filtered is pulled away from the filter membrane 80 when vacuum is applied in upper chamber 20. The anti-clogging apparatus 10 is placed inside the upper chamber of the conventional filter 70 so that opening 42 in fluid tube 40 comes in contact with suspension 100 and provides a means to re-circulate the suspension with a negative force pulling particulate matters away from the filter membrane.

To start filtration, a vacuum source must be connected to the bottom chamber through the built-in opening 82 in sidewall 76. The vacuum in the bottom chamber (though lower than atmospheric pressure) actually creates a positive pressure on the retention surface of the filter membrane 80 when part of the filtrate is sucked (broken arrows) into the bottom collection chamber 72. The main purpose of the present invention anti-clogging apparatus 10 is to provide a larger negative pressure on the retention surface membrane 80 in comparison to the positive pressure sucking the particulate matters onto the retention surface membrane, in every location on the filter membrane. This is partly achieved by diverting a major part of the vacuum source to recirculate the suspension which is achieved by the adaptor 90 to be described below. Therefore, the present invention anti-clogging apparatus 10 actually provides a net negative pressure on the retention surface and is therefore not merely a stirring device as used in the Amicon designs.

It is an additional design of the present device to provide in every location on the filter membrane a greater negative pressure than the positive pressure exerted in that location. For example, location C is expected to have the greatest positive pressure (e.g. as compared to D) since it is closest to the suction port 82. The present device will be placed in the upper chamber in such a way that opening 42, which provides the greatest negative pressure (near location A) will be located opposite to C and provides a greater negative pressure on the filter membrane than the positive pressure created by the vacuum in the lower chamber. Correspondingly, B has less negative pressure than A (because it is farther away from opening 42) but still has a more powerful negative pressure than the positive pressure at Location D).

This design is truly an anti-clogging device because negative pressures on particulate matters is designed to be always greater than the positive pressures moving them toward any part of the filter surface. Even during temporary disequilibrium of pressures at a given location along the filter fibers, the device is designed to unclog obstructed filter pores. The causes of pressure disequilibrium are many, but primarily because there are pressure gradients along different parts of the filter. Therefore, even though overall negative pressure is always greater than the positive pressure inside the filter unit, negative pressure at a given site is not always greater than the positive pressure exerted there. Consider the simple case of any single filter pore, X, located at any part of the hollow filter fiber inside the filter unit. Temporary disequilibrium of pressure may cause the positive pressure at X to exceed that of the negative pressure created by the pulling force of the recirculation vacuum source. The resultant net positive pressure will cause pore X to be temporarily clogged. Once pore X is clogged, the positive pressure created by the filtrate pump will decrease at X to zero, because flow rate there becomes zero. (Flow rate is equal to pressure divided by resistance. When X is obstructed, resistance at X becomes infinitely large and so the pressure in the direction of the flow of fluid becomes zero). Since the negative pressure at X created by the pulling force of the recirculation pump remains unchanged, a decrease of positive pressure at X to zero will allow an increasingly larger net negative pressure to unclog again the particulate matters temporarily obstructing X.

As shown in FIGS. 4 and 5, in contrast to the conventional top which has a loose fitting surface to the rim of the upper chamber, the present invention requires an airtight fitting top 14 so that only the air inlet 50, with a built-in resistor 55, will allow air in after a predetermined degree of negative pressure has been achieved.

Conventional filter 70 further comprises an opening 82 in sidewall 76 which in conventional designs is connected to a vacuum source. Consistently with the teaching that negative pressure on the filter membrane must be greater than the positive pressure, the vacuum source connected to the upper chamber must be more powerful than the vacuum source connected to the bottom chamber. If only one vacuum source is available, with the combination of the present invention anti-clogging apparatus 10 combined with conventional filter 70, it is necessary to have a vacuum adaptor 90 which allows more suctional force to be applied to the upper chamber than the lower chamber, such as having a large tubing section 92 going to suction port 22 of the present invention and a small tubing section 94 extending to suction opening 82 of the conventional filter. The adaptor is necessary to partition the vacuum source so that the negative pressure generated on the suspension side is sufficiently greater than the positive pressure used to extract fluid phase of the suspension through the filter membrane.

The present invention can also be defined as a device to be used in conjunction with a filter apparatus having (i) a container defining a first chamber therein, (ii) a second chamber on top of the first chamber within the container (iii) a filter membrane between the first chamber and second chamber, (iv) a first vacuum suction port opening out of the wall of the first chamber and set below the filter membrane, and (v) the second chamber capable of housing a suspension having particulates therein. The apparatus comprises: (a) a device having a top, a bottom, and a connecting column comprising a main fluid tube and an air inlet tube; (b) the bottom and connecting column of said device is to be placed into the top chamber of said container so that it rests within the suspension held in said second chamber; (c) said main fluid tube having a first opening through said bottom of the device and adjacent said filter membrane and having a second opening into said top chamber of said first container to thereby provide fluid communication therewith; (d) a second suction port attached to said top of the device and continuing into a section of tubing which extends into said top chamber of said container and terminates in a suction tube opening which rests adjacent said second opening of said main fluid tube; (e) an air inlet in said top of the device, extending into said air inlet tube which terminates in an air inlet tube opening within said top chamber of said container far away from said second opening of said main fluid tube; (f) a suction port adaptor connected to said first suction port and said second suction port to enable a single source of suction to generate a vacuum through both ports; and (g) the top of said device forms an airtight seal with the rim of the sidewall of said container; (h) said suction port adaptor configured to cause the suctional force generated through said second suction port to be greater than the suctional force generated through said first suction port; (i) whereby vacuum generated though said second suction port creates a vacuum within said top chamber of said container to thereby cause said suspension to be drawn through said main fluid tube and recirculated into the top chamber of said container and at the same time a portion of the fluid phase of the suspension is filtered through the filter membrane and the greater vacuum generated through said second suction port causes the particulate matter in said suspension to be drawn away from said filter membrane.

Instead of the adaptor and one source of vacuum, the present invention may include (a) a first source of suction connected to said first suction port; (b) a second source of suction connected to said second suction port to generate a vacuum within said top chamber of said container; and (c) the suction generated through said second suction port being greater than the suction generated through said first suction port; (d) whereby vacuum generated through said second suction port creates a vacuum within said top chamber of said container to thereby cause said suspension to be drawn through said main fluid tube and recirculated into the top chamber of said container and at the same time a portion of the fluid phase of the suspension is filtered through the filter membrane and the greater vacuum generated through said second suction port causes the particulate matter in said suspension to be drawn away from said filter membrane.

Defined more broadly, the present invention is an apparatus to be used in conjunction with a filter apparatus having (i) a container defining a first chamber and a second chamber on top of the first chamber therein; (ii) the second chamber capable of containing a suspension comprising particulates; (iii) the container including a filter means between the chambers; and (iv) means for generating a vacuum in the first chamber. The apparatus comprises: (a) means for receiving a suspension from said second chamber (b) means for drawing out suspension from said second chamber into said means for receiving suspension and recirculating suspension back to second chamber; and (c) means for generating a vacuum in said means for receiving suspension which is greater than the means for generating a vacuum in said first chamber, to thereby generate a net negative pressure on the suspension as it is drawn from said second chamber into said means for receiving the suspension to thereby draw the particulates in the suspension away from said filter means.

In addition to the apparatus, the present invention embodies the method as set forth above. The present invention can be defined as a method for preventing particulates in a suspension from clogging a filter membrane in an apparatus having a container defining a first chamber and a second chamber on top of first chamber therein, and including a filter membrane between the chambers and means for generating a vacuum in the first chamber, comprising: (a) generating a source of vacuum in the second chamber which is greater than the source of vacuum created in the first chamber; and (b) drawing suspension comprising particulates out of said second chamber such that a portion of the fluid phase of the suspension passes through the pores of the filter membrane while the particulates in the suspension are drawn away from the filter membrane by the greater negative pressure created by the greater vacuum inside the second chamber to thereby avoid clogging the filter membrane; and (c) matching locations on the filter membrane with the greatest positive (clogging) pressure with the greatest negative and overriding (anti-clogging) pressure.

Through use of the present invention, even though the conventional vacuum portion of the conventional filter unit 70 pushes the suspension and particulate matter toward the filter membrane 80, the present invention anticlogging apparatus 10 exerts a much greater negative pressure and through the fluid dynamics of recirculation pulls the particulate matter away from the filter membrane 80. The suspension travels up fluid tube 40 as shown and settles in the upper chamber 20, thereby housing the retentate or suspension 100. Lower chamber 72 houses the filtrate 110.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A device to be used in conjunction with a filter apparatus having (i) a container defining a first chamber therein, (ii) a second chamber on top of the first chamber within the container (iii) a filter membrane between the first chamber and second chamber, (iv) a first vacuum suction port opening out of the wall of the first chamber and set below the filter membrane, and (v) the second chamber capable of housing a suspension having particulates therein, the device comprising:

a. a top, a bottom, and a connecting column comprising a main fluid tube and an air inlet tube;
   b. the bottom and connecting column of said device to be placed into the top chamber of said container so that it rest within the top chamber and within the suspension held in said second chamber;
   c. said main fluid tube having a first opening through said bottom of the device and adjacent said filter membrane and having a second opening into said second chamber of said container to thereby provide fluid communication therewith;
   d. a second suction port attached to said top of the device and continuing into a section of tubing which extends into said top chamber of said container and terminates in a suction tube opening which rests adjacent said second opening of said main fluid tube;

e. an air inlet in said top of the device, extending into said air inlet tube which terminates in an air inlet tube opening immersed in the suspension within said top chamber of said container, the air inlet tube opening being far away from said first and second opening of said main fluid tube;

f. a suction port adaptor connected to said first suction port and said second suction port to enable a single source of suction to generate a vacuum through both ports;

g. the top of said device forms an air-tight seal with the rim of the sidewall of said container; and h. said suction port adaptor configured to cause the suctional force generated through said second suction port to be greater than the suctional force generated through said first suction port;

i. whereby vacuum generated though said second suction port creates a vacuum within said top chamber of said container to thereby cause said suspension to be drawn through said main fluid tube and recirculated into the top chamber of said container and at the same time a portion of the fluid phase of the suspension is filtered through the filter membrane and the greater vacuum generated through said second suction port causes the particulate matter in said suspension to be drawn away from said filter membrane.

2. The device in accordance with claim 1 wherein locations on the filter membrane with the greatest positive clogging pressure due to their proximity to the first suction portion are matched with the greatest negative anticlogging and overriding pressure from the main fluid tube to keep filter pores unclogged.

3. The device in accordance with claim 1 wherein said air inlet tube further comprises a built-in resistor which will only allow air into the top chamber of said container after a predetermined degree of negative pressure has been achieved within the chamber.

4. The device in accordance with claim 1 wherein said main fluid tube extends upwardly within said top chamber and extends beneath the top of the device and terminates in an opening immediately below the top of the device.

5. The device in accordance with claim 1 wherein said tube leading from said second suction port extends beneath the top of said device and terminates in an opening immediately below the top of said device.

6. The apparatus in accordance with claim 1 wherein said air inlet tube opening is located adjacent the bottom of said device.

7. A device to be used in conjunction with a filter apparatus having (i) a container defining a first chamber therein, (ii) a second chamber on top of the first chamber within the container (iii) a filter membrane between the first chamber and second chamber, (iv) a first vacuum suction port opening out of the wall of the first chamber and set below the filter membrane, and (v) the second chamber capable of housing a suspension having particulates therein, the device comprising:

a. a top, a bottom, and a connecting column comprising a main fluid tube and an air inlet tube;

b. the bottom and connecting column of said device to be placed into the top chamber of said container so that it rests within the top chamber and within the suspension held in said second chamber;

c. said main fluid tube having a first opening through said bottom of the device and adjacent said filter membrane and having a second opening into said second chamber of said container to thereby provide fluid communication therewith;

d. a second suction port attached to said top of the device and continuing into a section of tubing which extends into said top chamber of said container and terminates in a suction tube opening which rests adjacent said second opening of said main fluid tube;

e. an air inlet in said top of the device, extending into said air inlet tube which terminates in an air inlet tube opening immersed in the suspension within said top chamber of said container, the air inlet tube opening being far away from said first and second opening of said main fluid tube;

f. a first source of suction connected to said first suction port;

g. a second source of suction connected to said second suction port to generate a vacuum within said chamber of said second container; and h. the suction generated through said second suction port being greater than the suction generated through said first suction port;

i. whereby vacuum generated though said second suction port creates a vacuum within said top chamber of said container or thereby cause said suspension to be drawn through said main fluid tube and recirculated into the top chamber of said container and at the same time a portion of the fluid phase of the suspension is filtered through the filter membrane and the greater vacuum generated through said second suction port causes the particulate matter in said suspension to be drawn away from said filter membrane, and whereby locations on the filter membrane with the greatest positive clogging pressure are matched with the greatest negative anticlogging and overriding pressure to keep filter pores unclogged.

8. The device in accordance with claim 7 wherein locations on the filter membrane with the greatest positive clogging pressure due to their proximity to the first suction portion are matched with the greatest negative anticlogging and overriding pressure from the main fluid tube to keep filter pores unclogged.

9. The device in accordance with claim 7 wherein said air inlet tube further comprises a built-in resistor which will only allow air into the top chamber of said container after a pre-determined degree of negative pressure has been achieved within the chamber.

10. The device in accordance with claim 7 wherein said main fluid tube extends upwardly within said top chamber and extends beneath the top of the device and terminates in an opening immediately below the top of the device.

11. The device in accordance with claim 7 wherein said tube leading from said second suction port extends beneath the top of said device and terminates in an opening immediately below the top of said device.

12. The apparatus in accordance with claim 1 wherein said air inlet tube opening is located adjacent the bottom of said device.

13. A device to be used in conjunction with a filter apparatus having (i) a container defining a first chamber and a second chamber on top of the first chamber therein; (ii) the second chamber capable of containing a suspension comprising particulates; (iii) the container including a filter means between the chambers; and (iv) means for generating a vacuum in the first chamber, the device comprising:

a. means for receiving a suspension from said second chamber;
 b. means for drawing out suspension from said second chamber into said means for receiving suspension and recirculating suspension back to second chamber; and
 c. means for generating a vacuum in said means for receiving suspension which is greater than the means for generating a vacuum in said first chamber, to thereby generate a net negative pressure on the suspension as it is drawn from said second chamber into said means for receiving the suspension to thereby draw the particulates in the suspension away from said filter means.

14. A method for preventing particulates in a suspension from clogging a filter membrane in an apparatus having a container defining a first chamber and a second chamber on top of first chamber therein, and including a filter membrane between the chambers and means for generating a vacuum in the first chamber, comprising;
 a. generating a source of vacuum in the second chamber which is greater than the source of vacuum created in the first chamber; and
 b. drawing suspension comprising particulates out of said second chamber such that a portion of the fluid phase of the suspension passes through the pores of the filter membrane while the particulates in the suspension are drawn away from the filter membrane by the greater negative pressure created by the greater vacuum inside the second chamber to thereby avoid clogging the filter membrane.

15. The method in accordance with claim 14 further comprising matching locations on the filter membrane with the greatest positive clogging pressure with the greatest negative and overriding anti-clogging pressure from the source of vacuum in the second chamber.

* * * * *